No. 843,898. PATENTED FEB. 12, 1907.
E. LACE.
MEAT CHOPPING MACHINE.
APPLICATION FILED JAN. 18, 1906.

3 SHEETS—SHEET 1.

Witnesses,
Inventor,
Edward Lace

No. 843,898. PATENTED FEB. 12, 1907.
E. LACE.
MEAT CHOPPING MACHINE.
APPLICATION FILED JAN. 18, 1906.

3 SHEETS—SHEET 2.

Witnesses,
F. S. Mann
S. N. Pond

Inventor,
Edward Lace
By Offield, Towle & Linthicum
Attys

No. 843,898. PATENTED FEB. 12, 1907.
E. LACE.
MEAT CHOPPING MACHINE.
APPLICATION FILED JAN. 18, 1906.

3 SHEETS—SHEET 3.

Witnesses,
S. S. Mann
S. N. Pond

Inventor,
Edward Lace
By Offield, Towle & Linthicum
Attys.

UNITED STATES PATENT OFFICE.

EDWARD LACE, OF CHICAGO, ILLINOIS.

MEAT-CHOPPING MACHINE.

No. 843,898.          Specification of Letters Patent.          Patented Feb. 12, 1907.

Application filed January 18, 1906. Serial No. 296,669.

*To all whom it may concern:*

Be it known that I, EDWARD LACE, a citizen of the United States, residing at Chicago, in the county of Cook and State of Illinois, have invented certain new and useful Improvements in Meat-Chopping Machines, of which the following is a specification.

This invention relates to machines for chopping meat, and has reference more particularly to a machine for cutting up hogs and other animals in butchering establishments so as to divide them into hams, shoulders, loins, and other cuts or sections well known to the meat-packing trade. This work is at present performed manually, so far as I am aware, by large cleavers, and as so performed is exceedingly laborious and attended with considerable element of danger to the operators from accidents.

The object of the invention is to provide a simple and reliable machine for doing this work which requires on the part of the operator only the proper positioning of the carcass beneath the cutters to effect the desired cuts.

To this end my invention resides in a machine characterized chiefly by the employment, in association with a slotted table or platform on which the carcass may be positioned, of one or more power-driven rotary knives playing through said slot and operating on each revolution to effect a division of the carcass or of a part thereof in the same manner and with the same result as is now effected by a single blow of a manually-operated cleaver. In present practice the cleavers are maintained at their highest efficiency by frequent immersions in a tub of hot water so as to keep them hot and wet. By analogy to this practice I preferably employ beneath the table or platform of my machine a tank or vat designed to be filled with hot water and into which the knife of the cutter dips on each revolution.

My invention will be readily understood when considered in connection with the accompanying drawings, which show a practical mechanical embodiment thereof and wherein—

Figure 1:
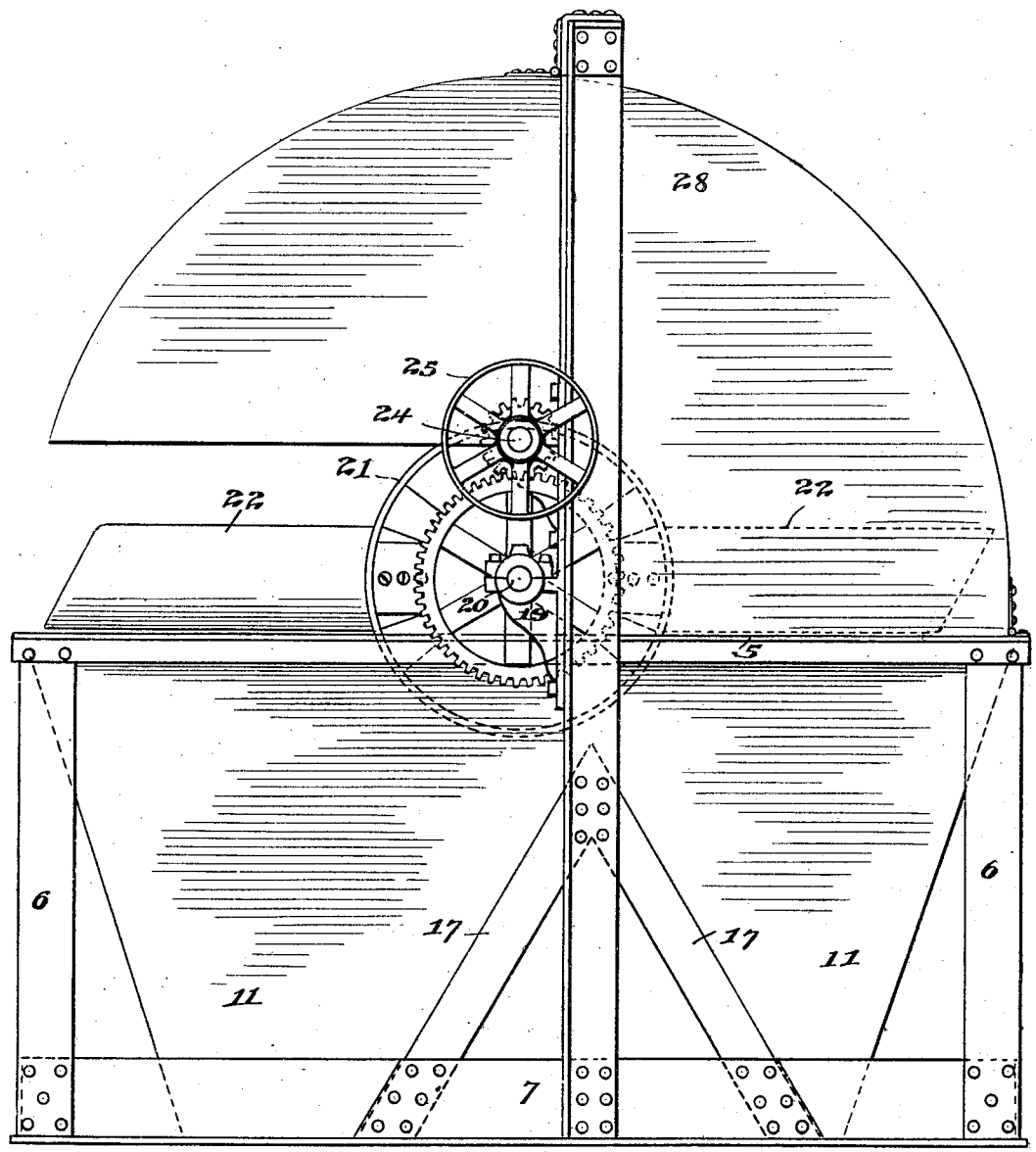
Figure 2:
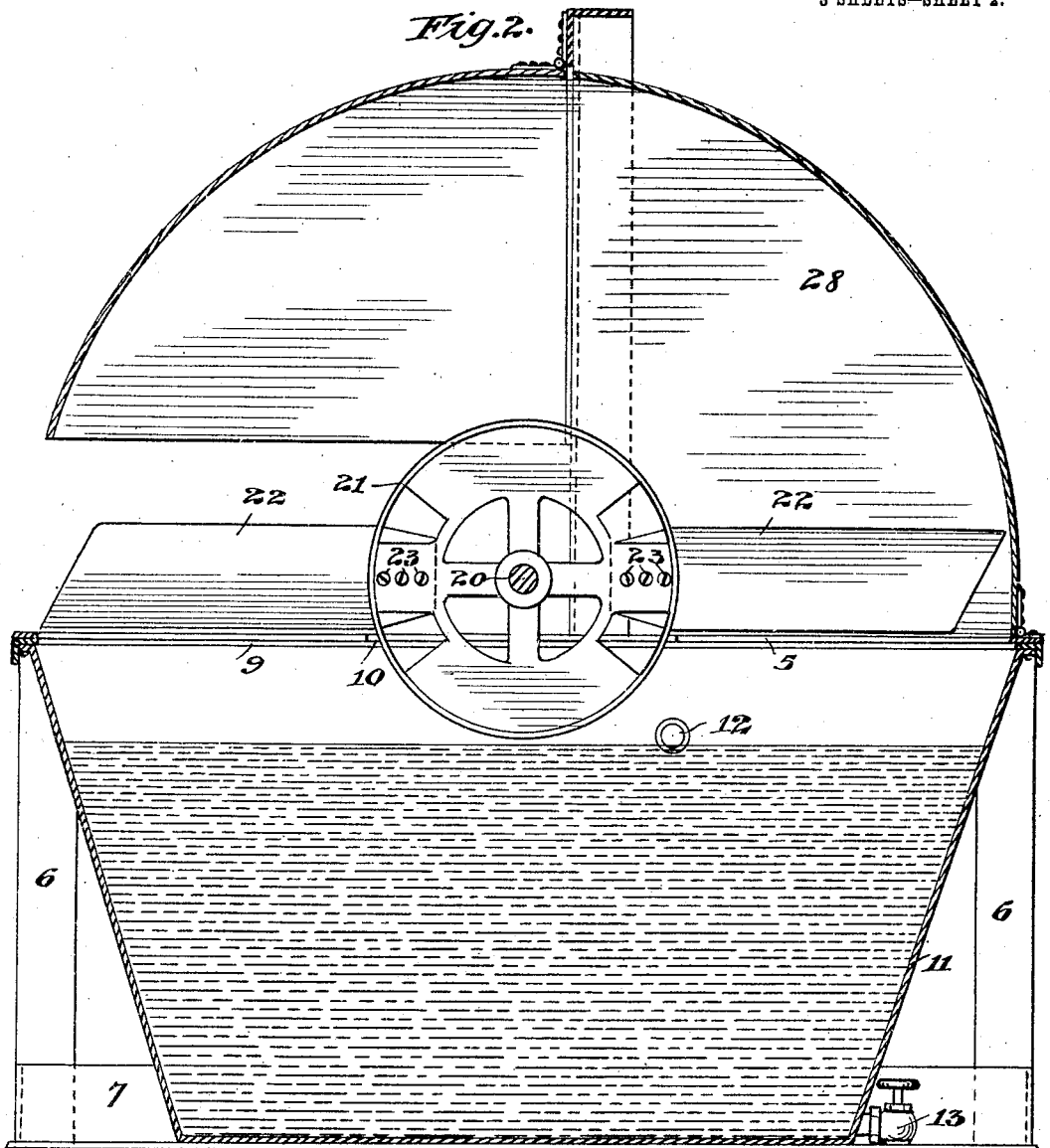
Figure 3:
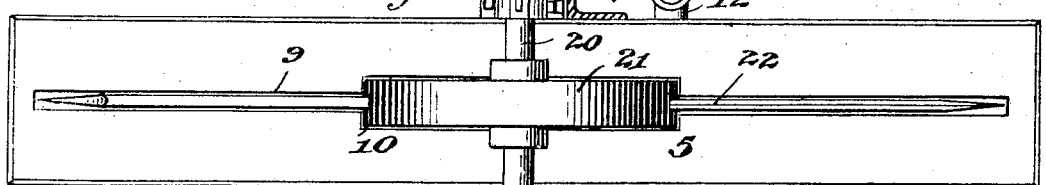

Figure 1 is a side elevational view of the complete machine. Fig. 2 is a vertical longitudinal sectional view thereof. Fig. 3 is a top plan view with upright members of the frame appearing in cross-section, and Fig. 4 is an end elevational view.

Referring to the drawings, 5 designates a horizontal table or platform suitably mounted and supported upon legs 6, preferably connected and rigidly braced at their lower ends by longitudinal and transverse tie-bars 7 and 8, respectively. On this table or platform and extending approximately the entire length thereof is a slot 9, having a central somewhat widened portion 10 for a purpose hereinafter described.

Beneath the table 5, and preferably rigidly secured to the under side thereof, as shown in Fig. 2, is a tank 11, adapted to be supplied with hot water through an inlet-pipe 12, Fig. 2, and a discharge-pipe 13.

Figure 4:
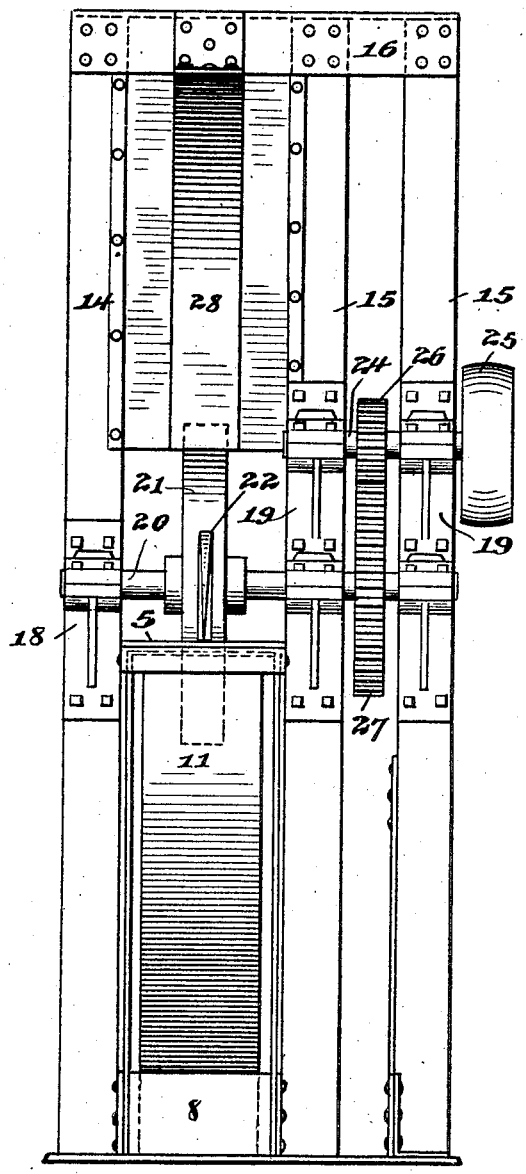

Approximately centrally of the table or platform are erected a series of uprights, which may cheaply and conveniently consist of sections of angle-iron, these uprights being most clearly shown in Fig. 4, comprising one member 14 on one side of the table and a pair of members 15 on the opposite side of the table, all of said members being disposed in the same plane transversely of the table. The uprights are united transversely at their upper ends by a cross-bar 16 and are suitably braced at their lower ends by diagonal braces 17, connecting them with the longitudinal tie-rods 7. (See Fig. 1.)

In suitable bearing-brackets 18 and 19, secured to the same sides of the uprights 14 and 15, respectively, is rotatably mounted a cutter-shaft 20, fast on which is a wheel 21, the lower portion of which plays through the enlarged intermediate portion 10 of the slot 9.

22 designates each a pair of large knife-blades or cleavers that are secured at diametrically opposite points in and to the periphery of the wheel 21, preferably by means of bolts 23, Fig. 2, securing the shanks of said knives rigidly in peripheral sockets of the wheel. To balance the wheel and give it considerable momentum when turning, the intermediate portions thereof lying between the knives are preferably made solid, as indicated in Fig. 2.

Any suitable or convenient driving mechanism may be applied to the shaft 20 within the purview of my invention, that herein shown comprising a short driving-shaft 24, rotatably mounted in the brackets 19 above the shaft 20 and carrying on its overhanging end a driving-pulley 25. A small spur-gear 26 on shaft 24 meshes with and drives a larger gear 27, fast on shaft 20.

From the foregoing it will be seen that power applied to the driving-pulley 25 will effect the rotation of the wheel or disk 21 and of the radial knives 22, carried thereby, causing said knives to pass successively edge first through slot 9 of the table at one end of the latter and, sweeping through the hot-water tank, to rise through the other end of the slot ready for the next stroke. The hog or other carcass is laid by the operator upon the left-hand end of the table or platform, as herein shown, being so disposed that the desired line of cleavage will lie coincident or substantially coincident with the slot of the table, which is coincident with the path of the knife. The sweep of the knife effects a clean and complete cut, the blade being reheated by its immersion into the underlying hot-water tank.

From the foregoing it will be seen that the machine of my invention provides a simple and reliable cutter wherein the path of travel of the hot and wet blade is absolutely certain and fixed, and the operator's only care is to properly position the carcass therebeneath to divide the latter on the desired lines and for his personal saftey to keep his hands and arms at a safe distance from the fixed path of travel of the knife. I have shown the machine as equipped with a pair of knives disposed one hundred and eighty degrees apart and contemplate that this number and arrangement will afford the maximum efficiency and the best results in service; but it will be understood that a greater or less number of knives or cleavers may be employed, if desired, within the purview of the invention.

As an additional safeguard against accidents resulting from carelessness I may mount upon the uprights of the machine a shield or hood 28 (best shown in Fig. 1) to cover and inclose the blades, it being necessary only to leave a sufficient space between the lower edge of said guard and the table for the insertion and manipulation of the carcass to be cut up.

I claim—

1. In a machine for the purpose described, the combination of a table adapted to support a carcass to be divided, a rotatable shaft, a cleaver-blade secured radially to said shaft and adapted to rotate therewith, means for rotating said shaft in a direction to drive said cleaver-blade edge foremost downwardly to effect the cutting operation, and means to maintain said cleaver-blade wet, substantially as described.

2. In a machine for the purpose described, the combination of a table adapted to support a carcass to be divided, a rotatable shaft, a cleaver-blade secured radially to said shaft and adapted to rotate therewith, means for rotating said shaft in a direction to drive said cleaver-blade edge foremost downwardly to effect the cutting operation, and means to maintain said cleaver-blade hot and wet, substantially as described.

3. In a machine for the purpose described, the combination of a table adapted to support a carcass to be divided, a rotary shaft, a cleaver-blade secured radially to said shaft and adapted to rotate therewith, a tank adapted to be supplied with hot water into which said cleaver-blade dips in its revolution whereby said blade is maintained hot, and means for rotating said shaft, substantially as described.

4. In a machine for the purpose described, the combination with a slotted table adapted to support a carcass to be divided, a shaft mounted above and across said table, a cleaver-blade secured radially to said shaft in the vertical plane of the slot of said table, a tank adapted to be supplied with hot water beneath said table into which said cleaver-blade dips whereby said blade is maintained hot, and means for rotating said shaft in a direction to drive said cleaver-blade edge foremost downwardly through the slot of said table, substantially as described.

5. In a machine for the purpose described, the combination of a slotted table adapted to support a carcass to be divided, a shaft mounted above and across said table, one or more cleaver-blades secured radially to said shaft in the vertical plane of the slot of said table, means for rotating said shaft in a direction to drive said blade or blades edge foremost downwardly through the slot of said table, a shield covering the major part of the path of travel of said blade or blades above said table, and a hot-water tank beneath said table, said blade or blades being adapted to be immersed in the hot water of said tank during their rotation whereby they are maintained hot and wet, substantially as described.

In testimony that I claim the foregoing as my invention I have hereunto subscribed my name in the presence of two witnesses.

EDWARD LACE.

Witnesses:
  SAMUEL N. POND,
  FREDERICK C. GOODWIN.